US012803027B2

(12) United States Patent
Kim et al.

(10) Patent No.: US 12,803,027 B2
(45) Date of Patent: Nov. 17, 2026

(54) ELECTROLYTE MEMBRANE FOR FUEL CELLS CONTAINING CATALYST COMPOSITE HAVING IMPROVED OXYGEN PERMEABILITY AND METHOD OF PRODUCING THE SAME

(71) Applicants: Hyundai Motor Company, Seoul (KR); Kia Corporation, Seoul (KR)

(72) Inventors: Byoungsu Kim, Yongin (KR); Bo Ki Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 259 days.

(21) Appl. No.: 18/483,845

(22) Filed: Oct. 10, 2023

(65) Prior Publication Data

US 2024/0055639 A1 Feb. 15, 2024

Related U.S. Application Data

(62) Division of application No. 17/028,475, filed on Sep. 22, 2020, now Pat. No. 11,824,242.

(30) Foreign Application Priority Data

Jan. 9, 2020 (KR) ........................ 10-2020-0002832

(51) Int. Cl.
*H01M 8/1051* (2016.01)
*H01M 8/10* (2016.01)
(Continued)

(52) U.S. Cl.
CPC ....... *H01M 8/1051* (2013.01); *H01M 8/1039* (2013.01); *H01M 8/1069* (2013.01); *H01M 2008/1095* (2013.01)

(58) Field of Classification Search
CPC ............. H01M 8/1051; H01M 8/1039; H01M 8/1069; H01M 2008/1095; H01M 8/1025;
(Continued)

(56) References Cited

U.S. PATENT DOCUMENTS 8,728,671 B1 5/2014 Brost et al.
9,847,533 B2 * 12/2017 Berta .................... H01M 4/881
(Continued)

FOREIGN PATENT DOCUMENTS

CN 102468507 A 5/2012
CN 103270630 A 8/2013
(Continued)

OTHER PUBLICATIONS

Shinizu et al., “Effects of Both Oxygen Permeability and Ion Exchange Capacity Rate for Cathode Inonmers on the Performance and Durability of Polymer Electrolyte Fuel Cells”, J. Electrochem Soc, 2018, 165, F3063-F3071.
(Continued)

*Primary Examiner* — Daniel S Gatewood
(74) *Attorney, Agent, or Firm* — Fox Rothschild LLP

(57) ABSTRACT

Disclosed is an electrolyte membrane for fuel cells including a catalytic composite including a catalytic particle coated with an oxygen-permeable material and a method of producing the same. The electrolyte membrane for fuel cells includes an ion transport layer including an ionomer having proton conductivity and a catalytic composite dispersed in the ion transport layer, and the catalytic composite includes a catalytic particle including a catalytic metal component having activity of decomposing hydrogen peroxide and a coating layer formed on at least a part of a surface of the catalytic particle and including an oxygen-permeable material.

6 Claims, 5 Drawing Sheets

(51) Int. Cl.
*H01M 8/1039* (2016.01)
*H01M 8/1069* (2016.01)

(58) Field of Classification Search
CPC .. H01M 8/1044; H01M 8/1053; H01M 8/106; H01M 8/1004; H01M 8/1055; H01M 8/1086; H01M 8/1058; H01M 8/1081; Y02E 60/50; Y02P 70/50
See application file for complete search history.

(56) References Cited

U.S. PATENT DOCUMENTS

| | | | | |
|---|---|---|---|---|
| 10,189,927 | B2 | 1/2019 | Ino et al. | |
| 2009/0039540 | A1 | 2/2009 | Nouji | |
| 2016/0064741 | A1* | 3/2016 | Kumaraguru ....... | H01M 8/1004 427/115 |
| 2017/0200956 | A1 | 7/2017 | Nagami et al. | |
| 2021/0202971 | A1 | 7/2021 | Kim et al. | |

FOREIGN PATENT DOCUMENTS

| | | | |
|---|---|---|---|
| JP | 2006-079904 | A | 3/2006 |
| JP | 2008-522365 | A | 6/2008 |
| JP | 2010027519 | A | 2/2010 |
| JP | 2011508369 | A | 3/2011 |
| JP | 2017-050143 | A | 3/2017 |
| JP | 2020119827 | A | 8/2020 |
| JP | 2020533756 | A | 11/2020 |
| KR | 10-2008-0047574 | A | 5/2008 |
| KR | 20150111852 | A | 10/2015 |
| WO | 2016001465 | A1 | 1/2016 |

OTHER PUBLICATIONS

Dupon Fuel Cells, Dupont Nafion PFSA Polymer Dispersions DE520/521, DE 1020/1021, DE 2020/2021, Material Data Sheet, pp. 1-2, 2006 (Year: 2003).
Aoki et al., "Decomposition mechanism of perfluorosulfonic acid electrolyte in polymer electrolyte fuel cells", Electrochem Commun., 8, 1509-1513, 2006.
D.E. Curtin et al., J. Power Sources, 131, 41-48 (2004).
A.P. Young et al., J. Electrochem Soc., 157, B425-B436 (2010).
P. Trogadas et al., Electrochem, Solid-State Lett., 11, B113-B116 (2008).
R. Uegaki et al., J. Power Sources, 196, 9856-9861 (2011).
D. Zhao et al., J. Power Sources, 190, 301-306 (2009).
R.W. Cahn et al., Mater. Sci. & Technol., Ch. 10, Wiley-VCH Verlag, GmBh (2000).
E. Endoh, ECS Trans., 16, 1229-1240 (2008).
E. Endoh, Handbook of Fuel Cells-Fundamentals, Technology and Applications, John Wiley & Sons, Ltd. (2010).
D. Banham et al., J. Electrochem. Soc., 161, F1075-F1080 (2014).
Y. Zhu et al., J. Membr Sci., 432, 66-71 (2013).
M.A. Hasan et al., Appl. Catal. A: General, 181, 171-179 (1999).
D. Zhao et al., J. Membr. Sci., 346, 143-151 (2010).
L. Gubler and W.H. Koppenol., J. Electrochem. Soc., 159, B211-B218 (2012).
P. Trogadas et al., Transition Metal Catalyst, J. Mater. Chem., 21, 19381-19388 (2011).
M. Aoki et al., Electrochem. Commun. 8, 1509-1513 (2006).
N. Macauley et al., Electrochem. Lett., 2(4), F33-F35 (2013).
M. Watanabe et al., J. Electrochem. Soc., 145, 1137-1141 (1998).
D. Zhao et al., J. Power Sources, 195, 4606-4612 (2010).
V. Atrazhev et al., ECS Transations, 1(8), 239-246 (2006).
R. Shimizu et al., J. Electrochem. Soc., 165(6), F3063-F3071 (2018).
A. Rolfi et al., J. Power Sources, 396, 95-101 (2018).

* cited by examiner

ELECTROLYTE MEMBRANE FOR FUEL CELLS CONTAINING CATALYST COMPOSITE HAVING IMPROVED OXYGEN PERMEABILITY AND METHOD OF PRODUCING THE SAME

CROSS-REFERENCE TO RELATED APPLICATION

This application is a Division of U.S. patent application Ser. No. 17/028,475, filed Sep. 22, 2020, which claims, under 35 U.S.C. § 119(a), the benefit of priority to Korean Patent Application No. 10-2020-0002832 filed on Jan. 9, 2020, the entire contents of which are incorporated herein by reference.

TECHNICAL FIELD

The present invention relates to an electrolyte membrane for fuel cells including a catalyst composite including a catalytic particle coated with an oxygen-peuneable material and a method of producing the same.

BACKGROUND

Generally used fuel cells for vehicles are polymer electrolyte membrane fuel cells (PEMFCs). In order for polymer electrolyte membrane fuel cells to normally exert a high power of at least several tens of kW or greater, they should be capable of stably operating across a wide current density range.

The reaction for electricity production by fuel cells occurs in a membrane-electrode assembly (MEA), which includes a perfluorinated sulfonic acid ((PFSA) ionomer-based membrane and a pair of electrodes, that is, an anode and a cathode. Hydrogen supplied to an anode, which is an oxidation electrode, is split into a proton and an electron, and then the proton is moved through the membrane to a reduction electrode, that is, a cathode, and the electron is moved via an exterior circuit to the cathode. Then, at the cathode, an oxygen molecule, the proton and the electron react with one another to produce electricity, and at the same time, water ($H_2O$) and heat, as byproducts.

Hydrogen and oxygen, which are reaction gases for fuel cells, may cross over through the electrolyte membrane. In this process, hydrogen peroxide (HOOH) may be produced. When hydrogen peroxide is split into an oxygen-containing radical such as a hydroxyl radical (·OH) and a hydroperoxyl radical (·OOH), the radicals attack the electrolyte membrane, causing chemical degradation of the electrolyte membrane and ultimately having the undesirable effect of reducing the durability of fuel cells.

As a method of mitivating such chemical degradation of the electrolyte membrane, the addition of various kinds of antioxidants to the electrolyte membrane has been suggested. The antioxidants include primary antioxidants functioning as radical scavengers or quenchers, secondary antioxidants functioning as hydrogen peroxide decomposers and the like.

Examples of representative primary antioxidants used for polymer electrolyte membrane fuel cells include cerium-based antioxidants such as cerium oxide (curia) and cerium (III) nitrate hexahydrate antioxidants, terephthalate-based antioxidants and the like.

The cerium oxide may broadly include pure cerium oxide ($CeO_2$) and modified cerium oxide (modified $CeO_2$). The modified cerium oxide includes cerium-zirconium oxide ($CeZrO_x$), cerium-manganese oxide ($CeMnO_x$), cerium oxide-doped silica, cerium oxide-doped yttrium oxide, cerium oxide-doped zirconium oxide and the like.

Meanwhile, representative secondary antioxidants used for electrolyte membranes include manganese-based catalysts such as manganese oxide and noble metal catalysts such as platinum (Pt). Recently, various studies have been conducted on the addition of platinum catalysts to an electrolyte membrane for fuel cells.

The results of research conducted to date has shown that the durability of the electrolyte membrane may be increased or decreased depending on the amount of platinum introduced into the electrolyte membrane, the degree of distribution thereof, and the microstructure. First, one positive effect is that the platinum introduced into the electrolyte membrane converts crossing-over hydrogen and oxygen gas to water before the gas reaches the electrode, thereby increasing the amount of water in the electrolyte membrane, increasing proton conductivity and ultimately improving the performance of the membrane-electrode assembly. In addition, another positive effect is that the platinum blocks the crossing-over hydrogen and oxygen gas to prevent radical generation, or decomposes hydrogen peroxide generated in the electrolyte membrane to increase the chemical durability of the electrolyte membrane. On the other hand, the negative effect is that the platinum introduced into the electrolyte membrane converts hydrogen peroxide into a radical, or directly converts crossing-over oxygen gas to a radical, resulting in reduced durability of the electrolyte membrane. Therefore, in order to increase the chemical durability of the electrolyte membrane by applying platinum to the electrolyte membrane, it is important to understand the operation mechanism of platinum in the electrolyte membrane and to propose a solution suitable therefor.

In order to effectively remove the hydrogen and oxygen gas crossing over in the electrolyte membrane, the crossing-over hydrogen and oxygen gas should together meet a hydrogen peroxide decomposition catalyst. However, it is difficult to identify and control the flow of the crossing-over gas since the electrolyte membrane is basically gas-occlusive. However, as described above, since the crossing-over gas may react with the hydrogen peroxide decomposition catalyst in the electrolyte membrane or thus be decomposed, or may move to the electrode to generate hydrogen peroxide, the crossing-over gas should be decomposed as much as possible by the hydrogen peroxide decomposition catalyst in the electrolyte membrane in order to prevent the crossing-over gas from reaching the electrode.

The above information disclosed in this Background section is provided only for enhancement of understanding of the background of the invention, and therefore it may include information that does not form the prior art that is already known in this country to a person of ordinary skill in the art.

SUMMARY

In preferred aspects, provided are, inter alia, electrolyte membrane that may significantly improve the chemical durability by allowing hydrogen and oxygen gas crossing over an electrolyte membrane so as to easily reach a catalytic metal included in the electrolyte membrane and therefore be decomposed by the catalytic metal.

In one aspect, provided is an electrolyte membrane for fuel cells including an ion transport layer including (i) an ionomer having proton conductivity, and (ii) a catalytic composite. The catalytic composite includes a catalytic particle including a catalytic metal component having an activity of decomposing hydrogen peroxide, and a coating layer formed on at least a part of a surface of the catalytic particle and including an oxygen-permeable material. In certain preferred aspects, the catalytic composite may be dispersed (e.g. substantially randomly or alternatively in an organized manner) in the ion transport layer.

The ionomer may suitably include a perfluorinated sulfonic acid ionomer.

The catalytic particle may suitably include the catalytic metal component without a support. Alternatively, the catalytic particle may suitably include the catalytic metal component supported on a support.

The catalytic metal component may include for example one or more selected from the group consisting of platinum (Pt), gold (Au), palladium (Pd), silver (Ag), osmium (Os), iridium (Ir), and ruthenium (Ru). The catalytic metal component may be supported on a support including one or more selected from the group consisting of carbon; silica; zeolites; transition metals selected from the group consisting of Groups 4B, 5B, 6B, 7B and 8B; and oxides or carbides of the transition metals.

The coating layer may be formed on at least a part of a surface of the catalytic metal component of a surface of the catalytic particle.

The oxygen-permeable material may be capable of conducting an ion.

The oxygen-permeable material may be compatible with the ionomer.

The oxygen-permeable material may have a greater oxygen permeability than an oxygen permeability of the ionomer.

The material may suitably include a perfluorinated sulfonic acid ionomer having an oxygen permeability, measured at any point within a temperature range of about 30° C. to 150° C. and a relative humidity range of about 20% to 100%, of about $3.0\times10^{-9}$ cc·cm/(cm$^2$·sec·cmHg) or more.

The electrolyte membrane may suitably include the catalytic composite in an amount of about 0.01 mg/cm 2 to 0.90 mg/cm 2.

The electrolyte membrane may further include a reinforcing layer, and the ion transport layer may be formed on at least one surface of the reinforcing layer.

The present invention provides a method of producing an electrolyte membrane for fuel cells. The method may include: preparing a catalytic composite comprising a catalytic particle comprising a catalytic metal component having activity of decomposing hydrogen peroxide and an oxygen-permeable material such that a coating layer comprising the oxygen-permeable material is formed on at least a part of a surface of the catalytic particle; preparing a dispersion admixture comprising the catalytic composite and an ionomer, and applying the dispersion admixture to form an ion transport layer.

The preparing catalytic composite may include drying a mixture including the catalytic particle and the oxygen-permeable material at a temperature of about 80° C. to 200° C.

The catalytic particle may include the catalytic metal component without a support, or may include the catalytic metal component supported on a support.

The catalytic metal may include one or more selected from the group consisting of platinum (Pt), gold (Au), palladium (Pd), silver (Ag), osmium (Os), iridium (Ir), and ruthenium (Ru). The support may include one or more selected from the group consisting of: carbon; silica; zeolites; transition metals selected from the group consisting of Groups 4B, 5B, 6B, 7B and 8B; and oxides or carbides of the transition metals.

The oxygen-permeable material may be capable of conducting an ion, may be compatible with the ionomer and may have a greater oxygen permeability than an oxygen permeability of the ionomer.

The material may include a perfluorinated sulfonic acid ionomer having an oxygen permeability, measured at any point within a temperature range of about 30° C. to 150° C. and a relative humidity range of about 20% to 100%, of about $3.0\times10^{-9}$ cc·cm/(cm$^2$·sec·cmHg) or greater.

The ionomer may suitably include a perfluorinated sulfonic acid ionomer.

The ion transport layer may be formed by applying the dispersion on at least one surface of a reinforcing layer.

Further provided is a fuel cell for a vehicle that includes the electrolyte membrane as described herein.

Other aspects the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
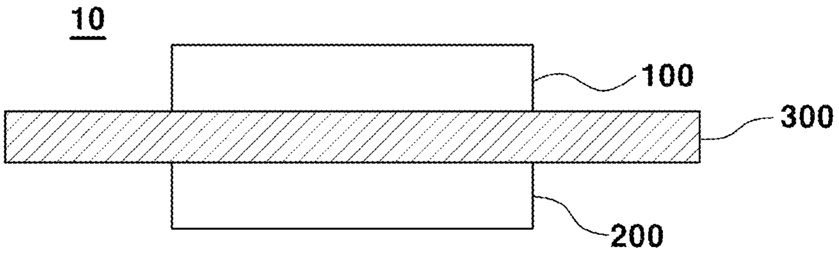
FIG. 1 is a sectional view schematically showing an exemplary membrane-electrode assembly according to an exemplary embodiment of the present invention.

The objects described above, and other objects, features and advantages, will be clearly understood from the following preferred embodiments with reference to the annexed drawings. However, the present invention is not limited to the embodiments, and will be embodied in different forms. The embodiments are suggested only to offer thorough and complete understanding of the disclosed contents and to sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, these elements should not be construed as being limited by these terms, and are used only to distinguish one element from another. For example, within the scope defined by the present invention, a first element may be referred to as a second element, and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numeric ranges are disclosed in the description, these ranges are continuous and include all numbers from the minimum to the maximum including the maximum within the ranges unless otherwise defined. Furthermore, when a range refers to integers, it includes all integers from the minimum to the maximum including the maximum within the range, unless otherwise defined.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is a sectional view schematically showing an exemplary membrane-electrode assembly (MEA, 10) according to an exemplary embodiment of the present invention. As shown in FIG. 1, the membrane-electrode assembly 10 includes a cathode 100, an anode 200, and a pair of electrodes 200 interposed therebetween.

The cathode 100 is a component that reacts with oxygen gas in the air and the anode 200 is a component that reacts with hydrogen gas. The anode 200 decomposes hydrogen into a hydrogen ion (proton) and an electron through a hydrogen-oxidation reaction (HOR). The hydrogen ion moves to the cathode 100 through the electrolyte membrane 300 contacting the anode 200. The electron moves to the cathode 100 through an external wire (not shown).

The cathode 100 and the anode 200 may include a catalyst such as carbon-supported Pt. The cathode 100 and the anode 200 may also include an ionomer (or binder) for conduction of protons therein.

Figure 2:
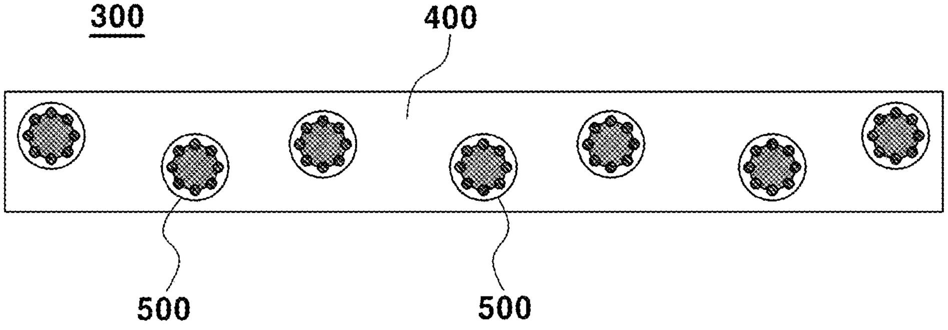
FIG. 2 shows an exemplary electrolyte membrane according to an exemplary embodiment of the present invention.

FIG. 2 shows an electrolyte membrane 300 according to an exemplary embodiment of the present invention. As shown in FIG. 2, the electrolyte membrane 300 includes an ion transport layer 400 and a plurality of catalytic composites 500 dispersed in the ion transport layer 400.

The ion transport layer 400 may include an ionomer having hydrogen ion (proton) conductivity. The ionomer may suitably include any material capable of delivering a proton. For example, the ionomer may include a perfluorinated sulfonic acid ionomer (PFSA).

Figure 3A:
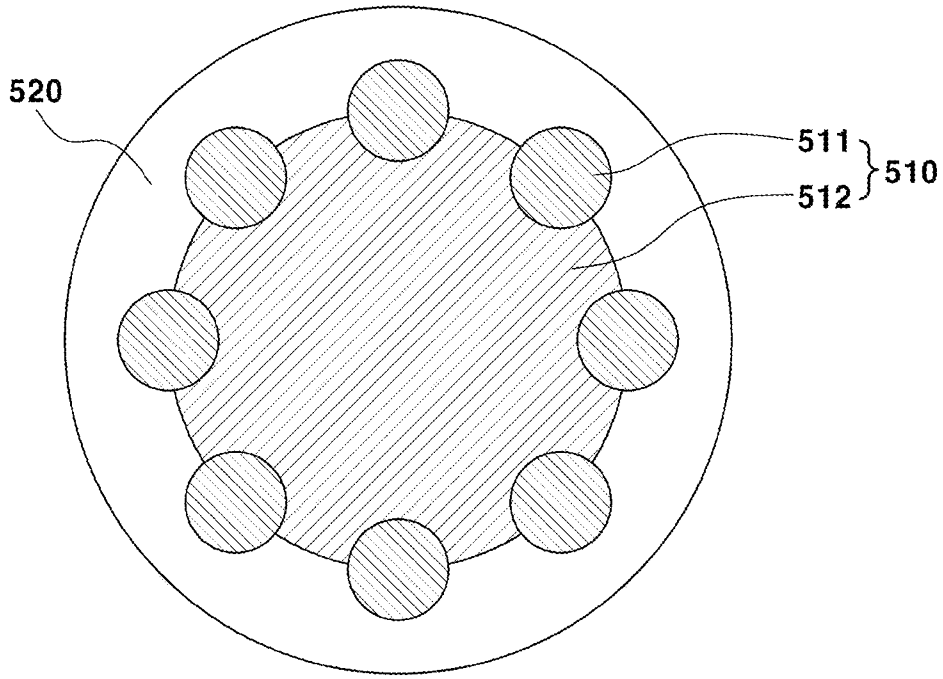
FIG. 3A shows an exemplary catalytic composite according to an exemplary embodiment of the present invention.

FIG. 3A illustrates an example of each catalytic composite 500. As shown in 3A, the catalytic composite 500 includes a catalytic particle 510 and a coating layer 520 formed on at least a part of the surface of the catalytic particle 510. FIG. 3A shows that the coating layer 520 completely coats the catalytic particle 510. However, this is provided for better understanding of the present invention, and thus the catalytic composite 500 should not be construed as being limited to the shape shown in FIG. 3A. For example, the coating layer 520 surrounds at least about 1%, at least about 5%, at least about 10%, at least about 20%, at least about 30%, at least about 40%, at least about 50%, at least about 60%, at least about 70%, at least about 80%, at least about 90%, or about 100% of the surface area of the catalytic particle 510.

Figure 3B:
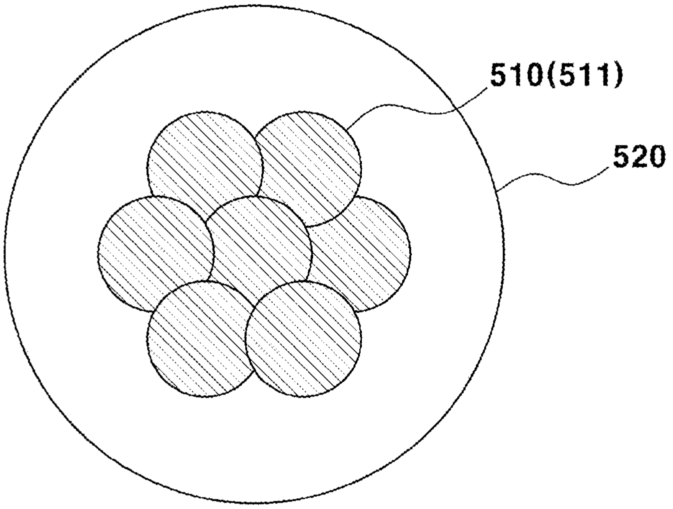
FIG. 3B shows an exemplary catalytic composite according to an exemplary embodiment of the invention.

FIG. 3B shows another example of the catalytic composite 500. As shown in FIG. 3B, the catalytic particle 510 may include only a catalytic metal component 511 without a support, and a coating layer 520 may be formed on at least a part of the surface of each catalytic particle 510.

Hereinafter, for convenience of description, the catalytic particle 510 is assumed to have a structure in which the catalytic metal component 511 is supported on the support 512. However, it should also be interpreted that the scope of the present invention includes a catalytic particle 510 not having such a support 512.

The catalytic metal component 511 is a metal having the activity of decomposing hydrogen peroxide, which may include one or more selected from the group consisting of platinum (Pt), gold (Au), palladium (Pd), silver (Ag), osmium (Os), iridium (Ir), and ruthenium (Ru).

The support 512 is not particularly limited, and may include one or more selected from the group consisting of: carbon; silica; zeolites; transition metals selected from the group consisting of Groups 4B, 5B, 6B, 7B and 8B; and oxides or carbides the transition metals.

The support 512 preferably may have a large specific surface area. As described above, a catalyst may also be added to the cathode 100 and/or the anode 200. The support 521 according to the present invention may have greater specific surface area than the support of the catalyst used for the electrode as described above. For example, the support used for the electrode should have a high graphitization degree so as to withstand carbon corrosion, which occurs rapidly when the electrode is exposed to a high voltage of greater than IV. However, since there is a tradeoff between the graphitization degree and the specific surface area, it is not easy in practice to obtain a support having both a high graphitization degree and a large specific surface area. Preferably, a support having a high specific surface area maybe used regardless of the graphitization degree because the support only needs to withstand an electric voltage difference of about 0 to about IV. The support 512 according to the present invention has a specific surface area of about 100 $m^2$/g to 3,000 $m^2$/g, about 500 $m^2$/g to 3,000 $m^2$/g, or particularly about 800 $m^2$/g to 3,000 $m^2$/g.

Therefore, the support 512 may support a large amount of the catalytic metal component. μm. In addition, the support 512 may have an average particle diameter of about 10 nm to 10 μm. The average particle diameter may be measured using a commercially available laser diffraction scattering particle size distribution analyzer, for example, a micro track particle size distribution measurement device. In addition, the average particle diameter may be calculated from 200 particles randomly extracted from an electron micrograph.

The catalytic composite 500 according to the present invention includes a coating layer 520 including an oxygen permeable material formed on at least a part of the surface of the catalytic particle 510.

Figure 4:
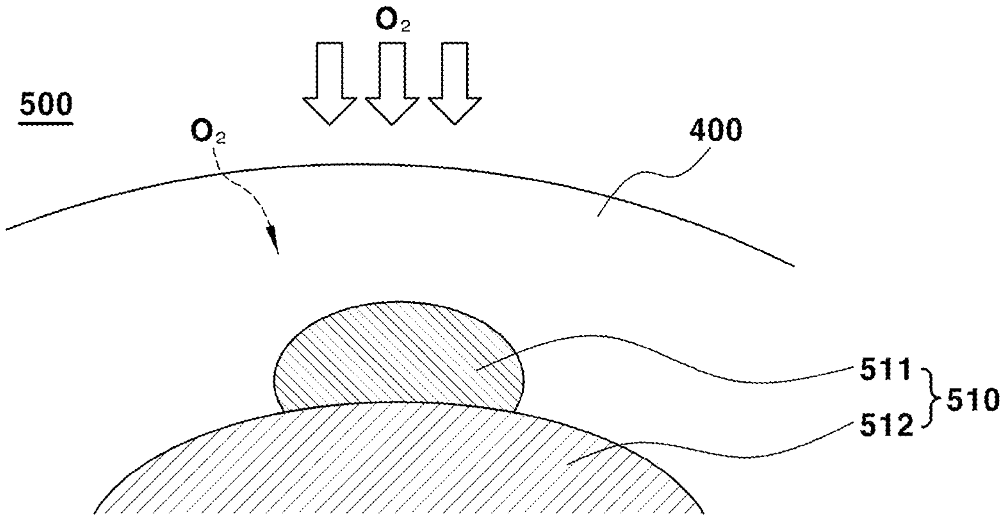
FIG. 4 shows a flow of oxygen gas crossing over an electrolyte membrane when there is no coating layer.
Figure 5:
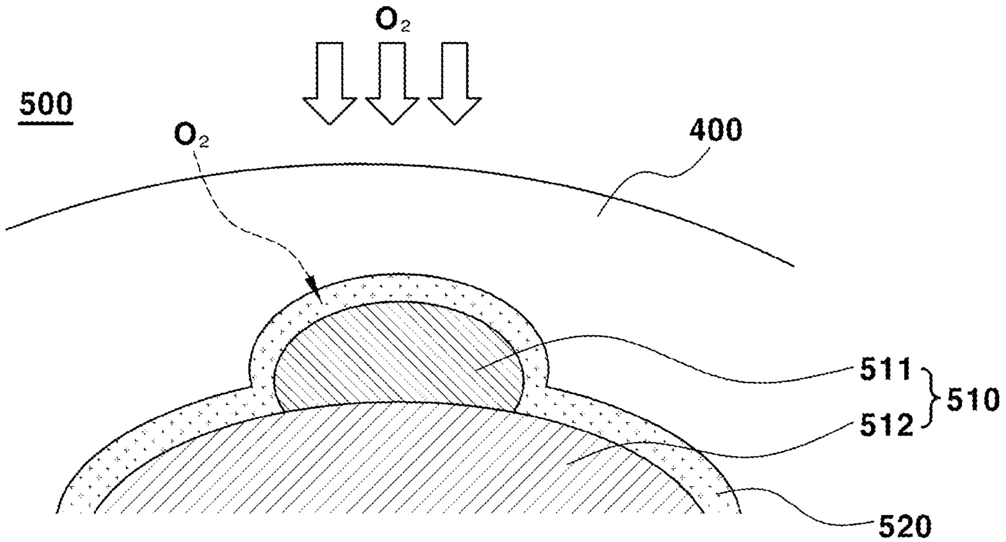
FIG. 5 shows a flow of oxygen gas crossing over an exemplary electrolyte membrane when a coating layer is formed according to an exemplary embodiment of the present invention.

FIG. 4 shows a flow of oxygen gas crossing over an exemplary electrolyte membrane 300 when the coating layer 520 is not present. FIG. 5 shows a flow of oxygen gas crossing over an exemplary electrolyte membrane 300 when an exemplary coating layer 520 is formed according to an exemplary embodiment of the present invention.

When the coating layer 520 is not present as shown in FIG. 4, the oxygen gas crossing over the electrolyte membrane may fail to reach the catalytic metal component 511, and may move to the electrode. When the coating layer 520 is present, as shown in FIG. 5, since the gas permeability of the periphery of the catalytic metal component 511 is greater than that of the periphery of the ion transport layer 400, the flow of oxygen gas may be induced, so the oxygen gas may easily reach the catalytic metal component 511.

As described above, the coating layer 520 may include an oxygen-permeable material. In addition, the coating layer 520 may be formed on at least a part of the surface of the catalyst particle 510, or particularly, on at least a part of the surface of the catalyst metal 511.

The material is not particularly limited, but the oxygen permeability thereof may be greater than that of the ionomer included in the ion transport layer 400. For example, the material may have an oxygen permeability, measured at any point within the temperature range of about 30° C. to 150° C. and a relative humidity range of about 20% to 100%, of $3.0\times10^{-9}$ cc·cm/(cm$^2$·sec·cmHg) or greater, or about $5.0\times10^{-9}$ cc·cm/(cm$^2$·sec·cmHg) or greater, or about $5.0\times10^{-9}$ cc·cm/(cm$^2$·sec·cmHg) or greater. The oxygen permeability of the material may preferably be about $3.0\times10^{-9}$ cc·cm/(cm$^2$·sec·cmHg) or greater so that the crossing-over oxygen gas may easily reach the catalytic metal component 511 as described above and thus be decomposed.

The oxygen permeability can be measured in accordance with JIS K7126-2 and ISO 15105-2, and maybe specifically calculated from the following Equation 1.

$$P=(X\times k\times T/(A\times D\times p)) \quad \text{[Equation 1]}$$

wherein P is oxygen permeability [cc·cm/(cm$^2$·sec·cmHg)], X is a permeation amount [cc], k is a correction factor, T is a thickness of the membrane [cm], A is a permeation area [cm 2], D is a tube passing time [sec], and p is an oxygen partial pressure [cmHg].

The material may be ion-conductive and may be compatible with the ionomer constituting the ion transport layer 400. Here, the term "compatible" means that when two substances are mixed, they are homogenized at the molecular level due to the identity or similarity in the chemical properties therebetween and thus neither phase separation nor formation of an interface occurs.

Thus, preferably, the material satisfies the aforementioned oxygen permeability and has chemical properties the same as or similar to those of the ionomer. For example, the material may suitably include a perfluorinated sulfonic acid polymer.

The electrolyte membrane 300 may suitably include the catalytic composite 500 in an amount of about 0.01 mg/cm$^2$ to 0.90 mg/cm$^2$ or about 0.05 mg/cm$^2$ to 0.40 mg/cm$^2$. When the content of the catalytic composite 500 is excessively low, the effect of increasing the chemical durability of the electrolyte membrane may be insignificant. On the other hand, when the content is excessively high, costs may greatly increase, and it may be difficult to secure electrical insulation in the electrolyte membrane.

Figure 6:
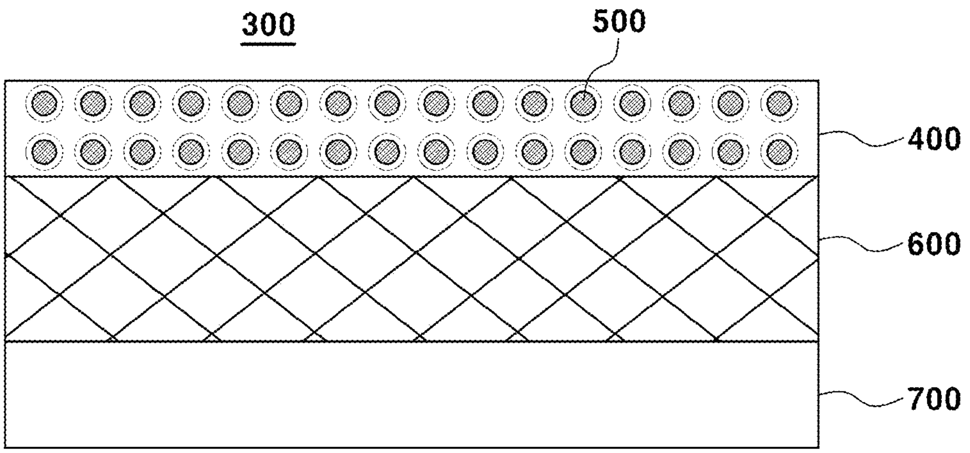
FIGS. 6 to 8 show a modified electrolyte membrane according to exemplary embodiments of the present invention.
Figure 7:
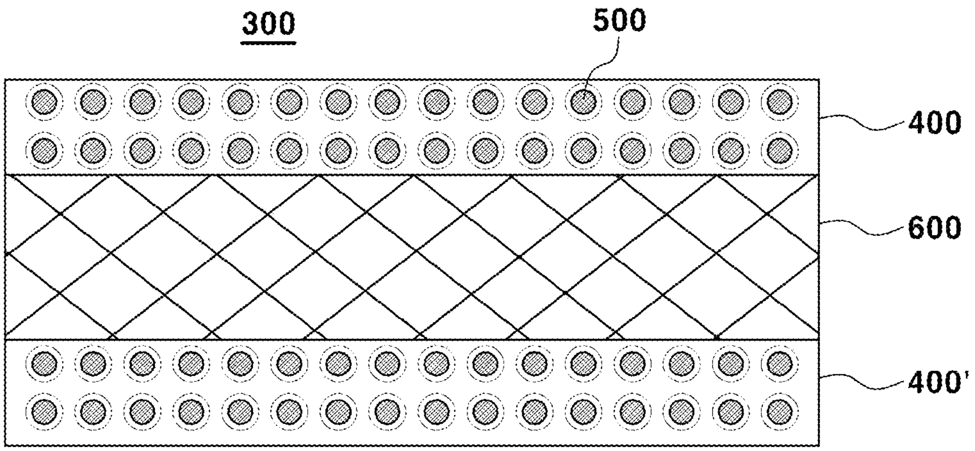
Figure 8:
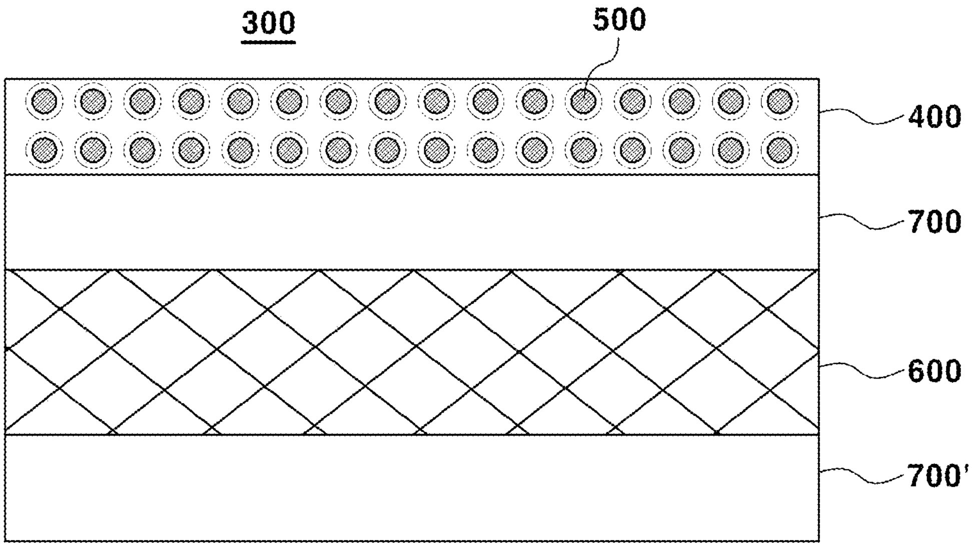

FIGS. 6 to 8 each show a modified structure of the electrolyte membrane 300 according to the present invention.

The electrolyte membrane 300 may include a reinforcing layer 600 and an ion transport layer 400 formed on at least one surface of the reinforcing layer 600.

The reinforcing layer 600 is a component for improving the mechanical strength (rigidity) of the electrolyte membrane 300. The reinforcing layer 300 may suitably include one or more selected from the group consisting of polytetrafluoroethylene (PTFE), expanded polytetrafluoroethylene (e-PTFE), polyethylene (PE), polypropylene (PP), polyphenylene oxide (PPO), polybenzimidazole (PBI), polyimide (PI), polyvinylidene fluoride (PVdF), and polyvinyl chloride (PVC), and may be a porous membrane having a large number of pores.

The reinforcing layer 600 may be porous and may be impregnated with the ionomer as described above.

As shown in FIG. 6, the electrolyte membrane 300 may include the ion transport layer 400 including the catalytic composite 500 on one surface of the reinforcing layer 600 impregnated with an ionomer, and may include an ionomer layer 700 including only an ionomer on the other surface thereof.

As shown in FIG. 7, the electrolyte membrane 300 may include ion transfer layers 400 and 400' including the catalytic composite 500 on two surfaces of the reinforcing layer 600 impregnated with an ionomer.

As shown in FIG. 8, the electrolyte membrane 300 may include an ion transfer layer 400 including an ionomer layer 700 and the catalytic composite 500 on one surface of the reinforcing layer 600 impregnated with an ionomer and another ionomer layer 700' on another surface thereof.

FIGS. 6 to 8 merely exemplarily show various embodiments of the electrolyte membrane 300 according to an exemplary embodiment of the present invention, but do not limit the scope of the electrolyte membrane 300. That is, any configuration other than the configurations shown in FIGS. 6 to 8 falls within the scope of the electrolyte membrane 300 according to an exemplary embodiment of the present invention, as long as the ion transport layer 400 including the catalytic composite 500 is formed on at least one surface of the reinforcing layer 600.

In an aspect, a method of producing the electrolyte membrane 300 may include steps of: preparing a catalytic composite 500 including a catalytic particle 510 including a catalytic metal component having activity of decomposing hydrogen peroxide and an oxygen-permeable material such that a coating layer including the oxygen-permeable material is formed on at least a part of a surface of the catalytic particle; preparing a dispersion admixture including the catalytic composite 500 with an ionomer; and applying the dispersion to form an ion transport layer 400.

Details of the respective components of the catalytic particle 510, the oxygen-permeable material, the catalytic composite 500 and the like have been described above, and will be omitted below.

The catalytic composite 500 may be prepared by drying a mixture obtained by mixing the catalytic particle with the above-mentioned material at a temperature of about 80° C. to 200° C. In this case, the mixture may be prepared by adding the catalytic particle and the material to a solvent, followed by stirring. When the drying temperature for the mixture is less than about 80° C., the solvent does not evaporate sufficiently, and thus it is difficult to powderize the catalytic composite 500, and when the temperature is greater than about 200° C., the material may be pyrolyzed.

The method of applying the dispersion admixture is not specifically limited. For example, the dispersion admixture may be applied by screen printing, spray coating, coating using a doctor blade, gravure coating, dip coating, silk screening, painting, coating using a slot die or the like.

As described above, the electrolyte membrane 300 may include the reinforcing layer 600.

The electrolyte membrane 300 shown in FIG. 6 may be produced through an exemplary method including applying an ionomer solution onto a substrate, supplying a porous reinforcing layer 600 to the ionomer solution to impregnate the reinforcing layer 600 with the ionomer and thereby to form an ionomer layer 700, applying the dispersion admixture to one surface of the reinforcing layer 600 facing the ionomer layer 700 to form an ion transport layer 400, and performing drying and heat treatment. However, the production method is not limited thereto, and may be performed by appropriately modifying specific means such as the order of each step and application. In addition, the electrolyte membrane 300 may be produced by other methods such as impregnation and transfer as well as application. This also applies to the case of other production methods described later.

The drying after forming the ion transport layer 400 may be performed at a temperature of about 100° C. or less for about 30 minutes or more. When the drying temperature is greater than about 100° C., the ionomer may be pyrolyzed. On the other hand, when the drying time is less than about 30 minutes, drying may not be sufficient.

The heat treatment may be carried out at a temperature of about 110° C. or greater for about 20 minutes or less. When the time for heat treatment is too long, the ionomer may be pyrolyzed.

The electrolyte membrane 300 shown in FIG. 7 may be produced through a method including supplying a porous reinforcing layer 600 to the dispersion admixture to impregnate the reinforcing layer 600 with an ionomer and thereby to form one ion transport layer 400', applying the dispersion to one surface of the reinforcing layer 600 facing the ion transport layer 400' to form another ion transport layer 400, and performing drying and heat treatment.

The electrolyte membrane 300 shown in FIG. 8 may be produced through a method including supplying a porous reinforcing layer 600 to the ionomer solution to impregnate the reinforcing layer 600 with the ionomer and thereby form one ionomer layer 700', applying an ionomer to one surface of the reinforcing layer 600 facing the ionomer layer 700' to form another ionomer layer 700, applying the dispersion admixture onto the ionomer layer 700 to form an ion transport layer 400, and performing drying and heat treatment.

The method may include adding the catalytic particle including a first metal and a second metal as described above to the ionomer solution and dispersing the same in the ionomer solution, applying the resulting product onto the reinforcing layer impregnated with the ionomer, and performing drying and heat treatment. However, the production method is not limited thereto, and specific means such as the order of respective steps or application thereof may be modified as appropriate. In addition, the electrolyte membrane 300 may be produced by other methods such as impregnation and transfer as well as application. This also applies to the other production method described later.

The electrolyte membrane 300 and the method of producing the same according to the present invention have been described above. The key feature of the present invention is that the catalytic particle 500 including the catalytic metal component 511 having the activity of decomposing hydrogen peroxide may be injected into the electrolyte membrane 300 and that a coating layer 520 including an oxygen-permeable material may be formed on the surface thereof, so that the oxygen gas crossing over the electrolyte membrane 300 can easily reach the catalytic metal component 511. It will be apparent that other embodiments designed or modified from the various exemplary embodiments described above can be easily derived from the present invention and fall within the scope of the present invention, as long as the embodiments have the aforementioned objects and effects.

As is apparent from the foregoing, the electrolyte membrane according to the present invention can exhibit improved chemical durability since hydrogen and oxygen gas crossing over the electrolyte membrane can more easily reach the catalytic metal component contained in the electrolyte membrane.

The electrolyte membranes according to various exemplary embodiments of the present invention can exhibit greatly improved chemical durability without deterioration in the performance of the electrolyte membrane since additional additives are not added to the electrolyte membrane.

The effects of the present invention are not limited to those mentioned above. It should be understood that the effects of the present invention include all effects that can be inferred from the foregoing description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of producing a membrane-electrode assembly for fuel cells, comprising:

preparing an electrolyte membrane; and manufacturing the membrane-electrode assembly comprising a cathode, an anode and the electrolyte membrane interposed therebetween, and wherein preparing the electrolyte membrane comprises:

preparing a catalytic composite comprising a catalytic particle comprising a catalytic metal component having activity of decomposing hydrogen peroxide and an oxygen-permeable material such that a coating layer comprising the oxygen-permeable material is formed on at least a part of a surface of the catalytic particle;

preparing a dispersion admixture comprising the catalytic composite and an ionomer; and applying the dispersion admixture to form an ion transport layer, wherein the oxygen-permeable material has greater oxygen permeability than an oxygen permeability of the ionomer, wherein the ionomer comprises a perfluorinated sulfonic acid ionomer, wherein the oxygen-permeable material comprises a perfluorinated sulfonic acid polymer having a greater oxygen permeability than an oxygen permeability of the ionomer, and having an oxygen permeability, measured at any point within a temperature range of about 30° C. to 150° C. and a relative humidity range of about 20% to 100%, of about $3.0\times10^{-9}$ cc·cm/(cm$^2$·sec·cmHg) or greater, and wherein the electrolyte membrane comprises the catalytic composite in an amount of about 0.05 mg/cm$^2$ to 0.40 mg/cm$^2$.

2. The method according to claim 1, wherein the preparing the catalytic composite comprises drying a mixture comprising the catalytic particle with the oxygen-permeable material at a temperature of about 80° C. to 200° C.

3. The method according to claim 1, wherein the catalytic particle comprises the catalytic metal component without a support, or comprises the catalytic metal component supported on a support.

4. The method according to claim 3, wherein the catalytic metal component comprises one or more selected from the group consisting of platinum (Pt), gold (Au), palladium (Pd), silver (Ag), osmium (Os), iridium (Ir), and ruthenium (Ru), and the support comprises one or more selected from the group consisting of: carbon; silica;

zeolites; transition metals selected from the group consisting of Groups 4B, 5B, 6B, 7B and 8B; and oxides or carbides of the transition metals.

5. The method according to claim 1, wherein the oxygen-permeable material is capable of conducting an ion, is compatible with the ionomer.

6. The method according to claim 1, wherein the ion transport layer is formed by applying the dispersion admixture on at least one surface of a reinforcing layer.

* * * * *